(12) United States Patent
Ishii et al.

(10) Patent No.: US 7,842,871 B2
(45) Date of Patent: Nov. 30, 2010

(54) SHEET MUSIC CREATION METHOD AND IMAGE PROCESSING SYSTEM

(75) Inventors: Maya Ishii, Kawasaki (JP); Fumihiro Goto, Kawasaki (JP); Ayumi Hori, Kawasaki (JP); Manabu Yamazoe, Tokyo (JP); Tohru Ikeda, Yokohama (JP); Hidetsugu Kagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 12/335,330

(22) Filed: Dec. 15, 2008

(65) Prior Publication Data

US 2009/0158915 A1 Jun. 25, 2009

(30) Foreign Application Priority Data

Dec. 21, 2007 (JP) ............................. 2007-331072

(51) Int. Cl.
*G10H 1/00* (2006.01)
(52) U.S. Cl. ................... 84/477 R; 84/483.1; 84/483.2; 84/600
(58) Field of Classification Search ........... 84/600–602, 84/477 R, 486, 483.2, 483.1
See application file for complete search history.

(56) References Cited

U.S. PATENT DOCUMENTS

| | | | | |
|---|---|---|---|---|
| 4,958,551 A * | 9/1990 | Lui | ............................. | 84/462 |
| 5,690,496 A * | 11/1997 | Kennedy | ................. | 434/307 R |
| 5,706,363 A | 1/1998 | Kikuchi | | |
| 5,864,631 A | 1/1999 | Shutoh | | |
| 5,931,680 A * | 8/1999 | Semba | ................... | 434/307 A |
| 6,169,239 B1 * | 1/2001 | Aiardo | ...................... | 84/483.2 |
| 6,175,070 B1 * | 1/2001 | Naples et al. | ................. | 84/609 |
| 6,333,455 B1 * | 12/2001 | Yanase et al. | ................. | 84/609 |
| 6,365,819 B2 * | 4/2002 | Yamada | ........................ | 84/609 |
| 6,380,471 B2 * | 4/2002 | Matsumoto | ............... | 84/477 R |
| 6,545,208 B2 * | 4/2003 | Hiratsuka | ..................... | 84/476 |
| 6,635,815 B2 | 10/2003 | Kosakaya | | |
| 6,727,418 B2 * | 4/2004 | Matsumoto | ............... | 84/477 R |
| 6,945,784 B2 * | 9/2005 | Paquette et al. | ......... | 434/307 A |
| 7,074,999 B2 * | 7/2006 | Sitrick et al. | .............. | 84/477 R |
| 7,094,960 B2 * | 8/2006 | Ikeya et al. | ............... | 84/471 R |
| 7,098,392 B2 * | 8/2006 | Sitrick et al. | .............. | 84/477 R |
| 7,579,541 B2 * | 8/2009 | Guldi | ........................ | 84/470 R |
| 7,649,134 B2 * | 1/2010 | Kashioka | ..................... | 84/600 |
| 7,703,014 B2 * | 4/2010 | Funaki | ........................ | 715/269 |
| 7,728,212 B2 * | 6/2010 | Fujishima et al. | ............. | 84/600 |
| 2001/0023633 A1 * | 9/2001 | Matsumoto | .................. | 84/478 |
| 2002/0005109 A1 * | 1/2002 | Miller | ......................... | 84/609 |
| 2002/0118562 A1 * | 8/2002 | Hiratsuka | ...................... | 365/1 |

(Continued)

FOREIGN PATENT DOCUMENTS

CA 2120657 A 7/1995

(Continued)

*Primary Examiner*—David S. Warren
(74) *Attorney, Agent, or Firm*—Canon U.S.A., Inc. I.P. Division

(57) ABSTRACT

Image data of sheet music formed from a plurality of pages is input, and the input image data is divided into bars. The complexity of performance of each divided bar is determined for each page. An easy-to-play portion is detected as a page feed position for each page in accordance with the determination result. The layout of the sheet music is changed based on the detected page feed position, and the layout-changed sheet music is output.

11 Claims, 15 Drawing Sheets

U.S. PATENT DOCUMENTS

| | | | |
|---|---|---|---|
| 2003/0005814 A1* | 1/2003 | Matsumoto | 84/477 R |
| 2004/0069115 A1* | 4/2004 | Hiratsuka et al. | 84/483.1 |
| 2004/0112201 A1* | 6/2004 | Funaki | 84/477 R |
| 2005/0016361 A1* | 1/2005 | Ikeya et al. | 84/602 |
| 2005/0016368 A1* | 1/2005 | Perla | 84/723 |
| 2007/0022866 A1* | 2/2007 | Perla | 84/609 |
| 2008/0092723 A1* | 4/2008 | Sawyer-Kovelman et al. | 84/724 |
| 2008/0156171 A1* | 7/2008 | Guldi | 84/466 |
| 2009/0013855 A1* | 1/2009 | Fujishima et al. | 84/604 |
| 2009/0158915 A1* | 6/2009 | Ishii et al. | 84/483.1 |
| 2009/0161164 A1* | 6/2009 | Goto et al. | 358/1.18 |
| 2009/0161176 A1* | 6/2009 | Yamazoe et al. | 358/474 |
| 2009/0161917 A1* | 6/2009 | Hori et al. | 382/113 |

FOREIGN PATENT DOCUMENTS

| | | |
|---|---|---|
| JP | 05-035924 A | 2/1993 |
| JP | 06-102869 A | 4/1994 |
| JP | 06-102870 A | 4/1994 |
| JP | 06-102871 A | 4/1994 |
| JP | 06-149235 A | 5/1994 |
| JP | 06-149236 A | 5/1994 |
| JP | 07-304245 A | 11/1995 |
| JP | 07-311543 A | 11/1995 |
| JP | 2879941 B | 4/1999 |
| JP | 3169142 B | 5/2001 |
| JP | 2002-144664 A | 5/2002 |
| JP | 2003-177745 A | 6/2003 |
| JP | 3801939 B | 7/2006 |

* cited by examiner

FIG. 3
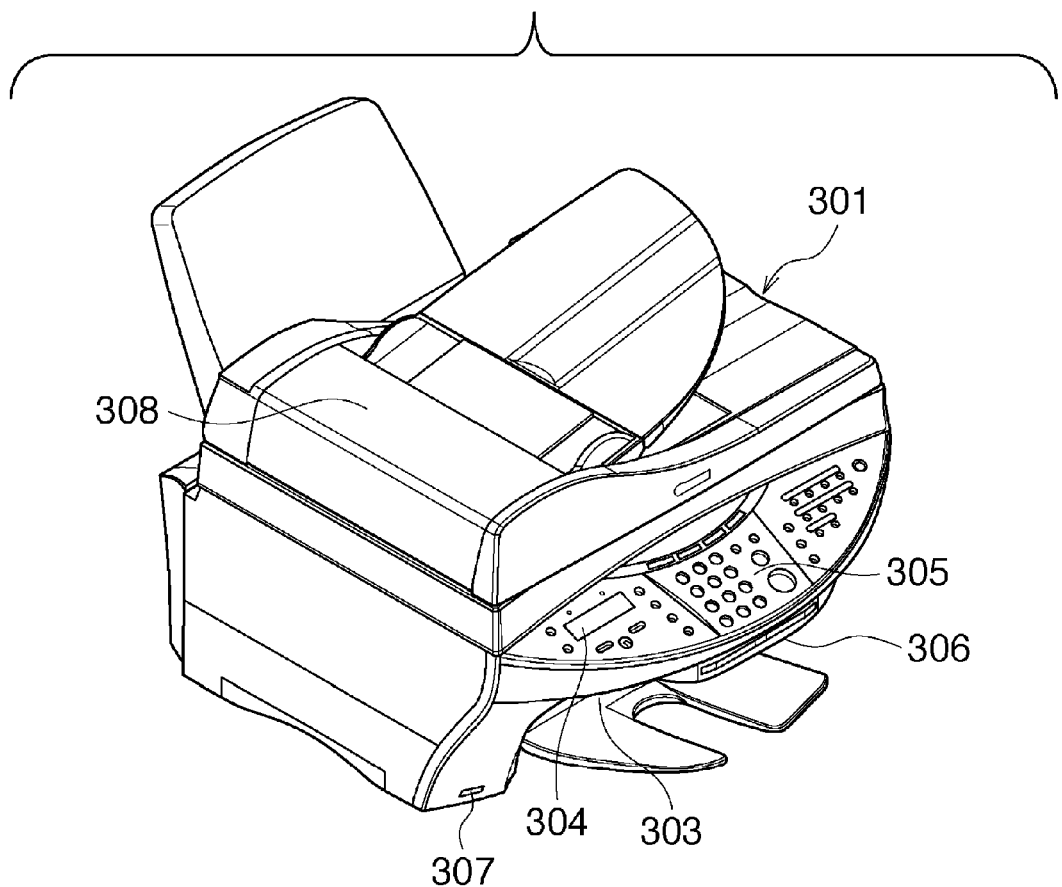
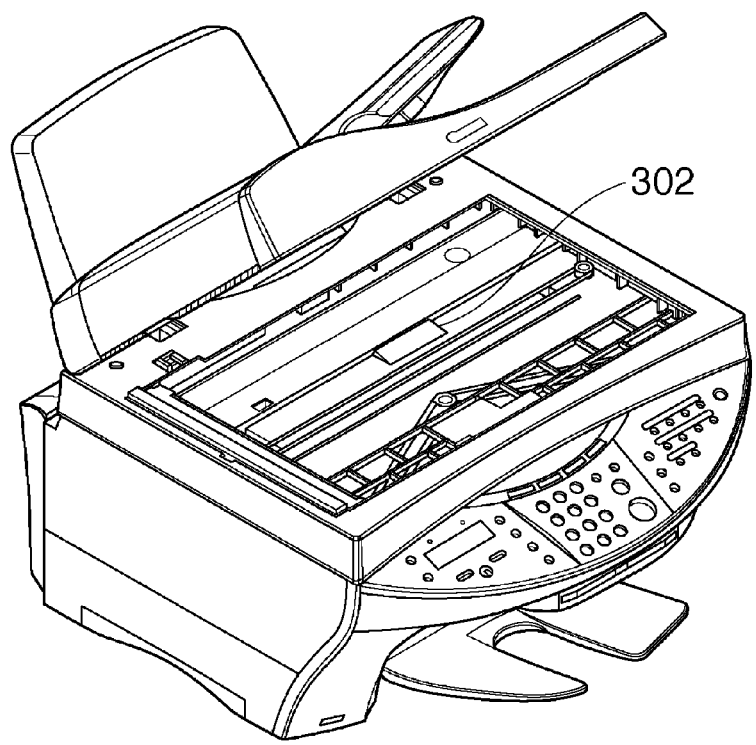

FIG. 10
(1) 
(2) 
(3) 
(4) 
(5) 
(6) 

F I G. 16
16A
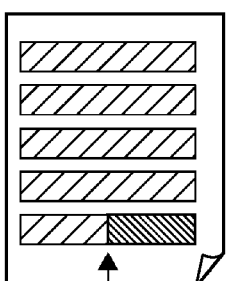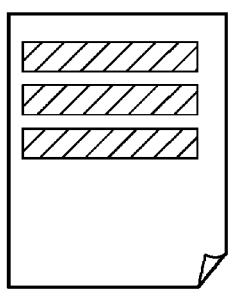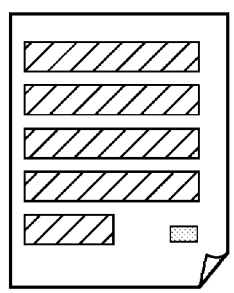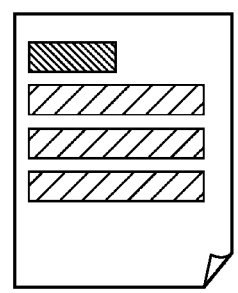
PAGE FEED POSITION
16B
PAGE FEED POSITION
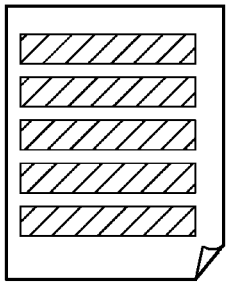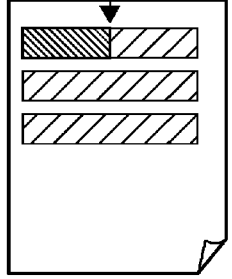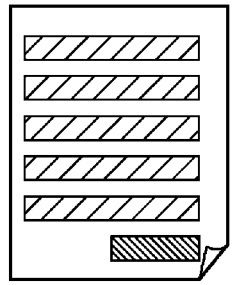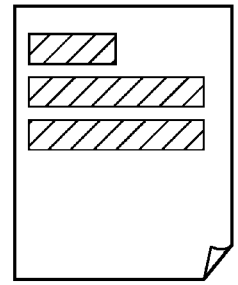
16C
PAGE FEED POSITION
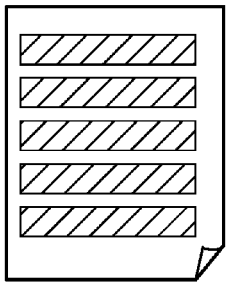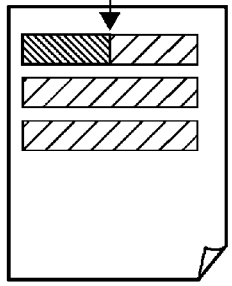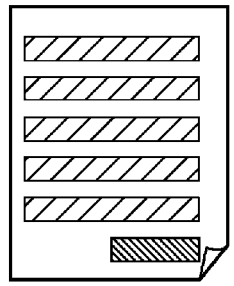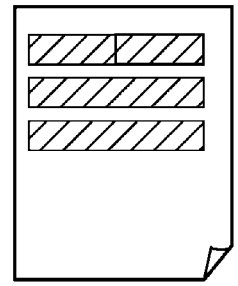

SHEET MUSIC CREATION METHOD AND IMAGE PROCESSING SYSTEM

BACKGROUND OF THE INVENTION

1. Field of the Invention

The present invention relates to a sheet music creation method and image processing system and, more particularly, to a sheet music creation method and image processing system for analyzing image data of sheet music input from an image input device such as a scanner or multifunctional peripheral, and changing the layout of the sheet music in accordance with the analysis result.

2. Description of the Related Art

As low-cost scanner devices become available, an original can be easily scanned and converted into digital data even at home. Inkjet printers as printing apparatuses have been developed, and even a multifunctional peripheral called a multifunction printer capable of not only printing an image, but also scanning an image becomes popular. The user can use a scanner device and printer device to easily copy his originals and contents at home.

An example of contents which improve user's convenience when copied is "sheet music". In general, the user purchases sheet music as a book. However, it impairs user's convenience to set sheet music purchased as a book directly on a music stand. For example, when the user sets sheet music of many pages directly on a music stand to see a desired page, he must forcibly open the sheet music, damaging the sheet music. To prevent this, a music stand devised to fix sheet music at a desired page is also commercially available. However, such a music stand makes it difficult to turn a page. It is generally cumbersome to turn a page of sheet music during the performance. This work is very troublesome especially during the performance of a musical instrument using both hands, such as the piano.

During the music lesson of the piano or the like, the teacher often writes an instruction directly on sheet music. It is popular to copy sheet music and keep the original clean.

When editing and distributing sheet music of a composition by a user or when editing music composed in response to user's request and distributing it as sheet music, various editing operations are required. For this purpose, a technique for, for example, editing sheet music is disclosed.

Conventionally, when editing sheet music, the player finds out from it a portion where he can easily turn a page, and edits the sheet music so that he can turn a page at this portion. However, according to this sheet music editing method, the player sometimes wrongly edits sheet music. A long time is taken to create new sheet music. To prevent this, the following technique is disclosed.

Japanese Patent Laid-Open No. 2003-177745 discloses an image processing apparatus which allows the user to set a page feed sign at a desired position in digital data of sheet music, and turn a page upon recognizing the sign. This image processing apparatus allows turning a page in accordance with the level of the performance technique of a player or his preference. Japanese Patent Registration No. 3801939 discloses an image processing apparatus which turns a page by determining, as a break of sheet music, a position at which a predetermined number of specific characters or signs continue. This image processing apparatus can automatically turn a page.

SUMMARY OF THE INVENTION

Sheet music as a general book describes information for a performance on the basis of rules built up through the historical development. Sheet music is not convenient for all players. A player edits sheet music by, for example, copying it and dividing the copy into a plurality of pieces so as to easily turn a page, or coloring sheet music or adding signs to it so as to make it easy for himself to play. The editing work optimizes sheet music for the player. However, it is very cumbersome for the player to edit sheet music, so demands have arisen for easily editing sheet music.

However, according to the image processing apparatus in Japanese Patent Laid-Open No. 2003-177745, the user must set a page feed position of sheet music. When sheet music has a large number of pages, it is very cumbersome to set page feed positions in all pages. The image processing apparatus in Japanese Patent Registration No. 3801939 determines, as a break of sheet music, a position at which a predetermined number of specific characters or signs continue. However, if no such position exists, the image processing apparatus cannot set a page feed position.

The present provides a sheet music creation method and image processing system capable of easily, reliably creating sheet music for personal use that facilitates the turn of pages.

The present invention in its first aspect provides a sheet music creation method of creating new sheet music by changing a page feed position in sheet music formed from a plurality of pages. The method includes inputting image data of the sheet music formed from the plurality of pages; dividing the image data input in the step of inputting into bars; determining, for each page, complexity of performance of each bar divided in the steps of dividing; detecting an easy-to-play portion as a page feed position for each page in accordance with a determination result in the step of determining; changing a layout of the sheet music on the basis of the page feed position detected in the step of detecting; and outputting the sheet music whose layout has been changed in the step of changing.

The present invention in its second aspect provides an image processing system which includes a host apparatus; an image reading apparatus configured to be connected to the host apparatus; and a printing apparatus configured to be connected to the host apparatus. The system is configured to create new sheet music by changing a page feed position in sheet music formed from a plurality of pages. The image reading apparatus reads image data of the sheet music formed from the plurality of pages. The host apparatus includes a division unit configured to divide the image data read by the image reading apparatus into bars; a determination unit configured to determine, for each page, complexity of performance of each bar divided by the division unit; a page feed position detection unit configured to detect an easy-to-play portion as a page feed position for each page in accordance with a determination result of the determination unit; and a layout change unit configured to change a layout of the sheet music on the basis of the page feed position detected by the page feed position detection unit. Further, the printing apparatus prints the sheet music whose layout has been changed by the layout change unit.

The present invention in a third aspect provides an image processing system including a host apparatus; and a multifunctional peripheral configured to be connected to the host apparatus. The multifunctional peripheral includes an image reading unit; and a printing unit. The system is configured to create new sheet music by changing a page feed position in sheet music formed from a plurality of pages. The host apparatus includes a division unit configured to divide, into bars, image data of sheet music which is read by the image reading unit and formed from a plurality of pages; a determination unit configured to determine, for each page, complexity of performance of each bar divided by the division unit; a page feed position detection unit configured to detect an easy-to-play portion as a page feed position for each page in accordance with a determination result of the determination unit; and a layout change unit configured to change a layout of the sheet music on the basis of the page feed position detected by the page feed position detection unit. The multifunctional peripheral is configured to cause the printing unit to print the sheet music whose layout has been changed by the layout change unit.

The present invention in a fourth aspect provides a computer-readable medium containing computer-executable instructions to be utilized in an image processing system for creating new sheet music by changing a page feed position in sheet music formed from a plurality of pages. In particular, the medium includes computer-executable instructions for inputting image data of the sheet music formed from the plurality of pages; computer-executable instructions for dividing the input image data into bars; computer-executable instructions for determining, for each page, complexity of performance of each divided bar; computer-executable instructions for detecting an easy-to-play portion as a page feed position for each page in accordance with a determination result from the determining step; computer-executable instructions for changing a layout of the sheet music on the basis of a detected page feed position; and computer-executable instructions for outputting the sheet music whose layout has been changed.

According to the aforementioned present invention, the complexity of performance is determined by analyzing image data of sheet music, and the page feed position is changed to create new sheet music. Hence, sheet music which facilitates the turn of pages can be created. Since the page feed position is set automatically, the burden on the user is reduced. Further, image data is analyzed for each page to set a page feed position, so the page feed can be set reliably.

Further features of the present invention will become apparent from the following description of exemplary embodiments with reference to the attached drawings.

BRIEF DESCRIPTION OF THE DRAWINGS

FIG. 3 is a schematic perspective view of the outer appearance of an MFP according to an embodiment of the present invention;

FIG. 10 is a view for explaining great staff block division;

FIG. 16 is an explanatory view showing examples of layout change; and

DESCRIPTION OF THE EMBODIMENTS

Figure 1:
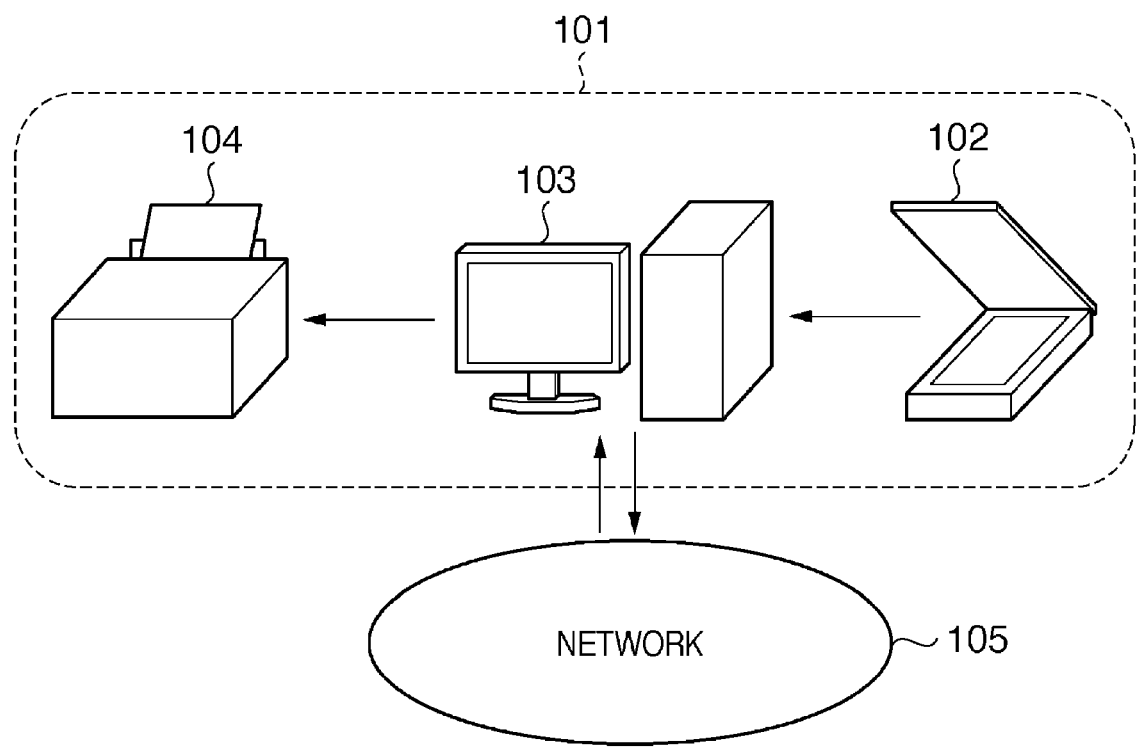
FIG. 1 is a conceptual view showing an example of the configuration of an image processing system according to the present invention.

Various embodiments of the present invention will be described in detail below with reference to the accompanying drawings. The same reference numerals denote the same parts, and a description thereof will not be repeated.

An embodiment for practicing the present invention by application software running on a personal computer (to be referred to as a PC hereinafter) serving as a host apparatus will be explained.

FIG. 1 is a conceptual view showing an example of the configuration of an image processing system according to the present invention.

An image processing system 101 in FIG. 1 includes a scanner 102 serving as an image reading apparatus, a PC 103, and a printer 104 serving as a printing apparatus. It is possible to change the layout of sheet music scanned by the scanner 102 and print the resultant sheet music by the printer 104. The PC 103 is connected to an external network 105.

Figure 2:
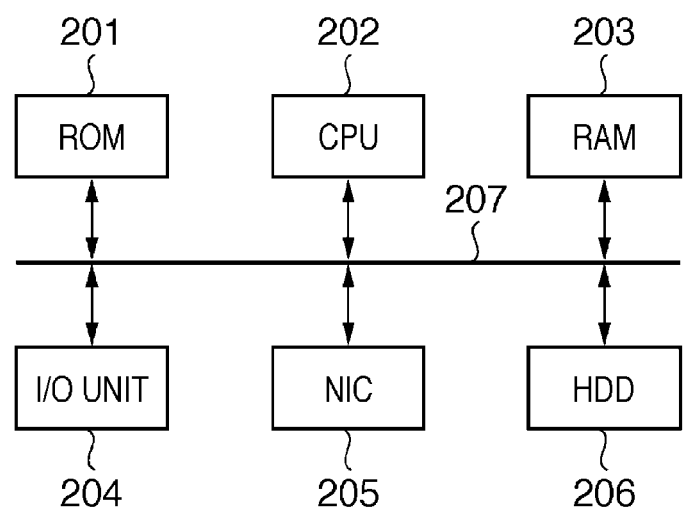
FIG. 2 is a block diagram of the image processing system in FIG. 1.

FIG. 2 is a block diagram of the PC 103 of the image processing system 101 shown in FIG. 1.

In FIG. 2, reference numeral 201 denotes a ROM (Read Only Memory). Reference numeral 202 denotes a CPU (Central Processing Unit). Reference numeral 203 denotes a RAM (Random Access Memory). Reference numeral 204 denotes an I/O (Input/Output). Reference numeral 205 denotes a NIC (Network Interface Card). Reference numeral 206 denotes an HDD (Hard Disk Drive). Reference numeral 207 denotes a bus.

The CPU 202 controls the operation of the overall host apparatus (PC 103) via the bus 207 in accordance with a program and data stored in the ROM 201. At the same time, the CPU 202 performs image processing using the RAM 203 as a work memory. For example, the CPU 202 performs image processing for image data input via the I/O unit 204 or NIC 205, or image data stored in advance in a storage medium such as the HDD 206. The CPU 202 outputs the processed image data via the I/O unit 204 or NIC 205, or stores it in a storage medium such as the HDD 206.

For example, the I/O unit 204 is connected via a predetermined interface to an image input/output device such as a monitor (e.g., CRT or LCD), a printer, or a scanner, or a storage device having a storage medium such as a magnetic disk or optical disk. The I/O unit 204 can receive/output image data via the NIC 205 from/to a computer device connected to the storage device and the above-mentioned image input/output device. Examples of the network are Ethernet (registered trademark), FDDI (Fiber Distributed Data Interface), IEEE1394 serial bus, and USB (Universal Serial Bus).

The same effects as the above-described ones can also be obtained by using an image processing system in which a single image processing apparatus operates without the mediacy of a PC.

FIG. 3 is a schematic perspective view of the outer appearance of a multi-function printer (to be referred to as an MFP hereinafter) 301 serving as a multifunctional peripheral according to an embodiment of the present invention. The MFP 301 has the function of a general PC printer which receives data from a PC and prints it, and the function of a scanner. Further, the MFP 301 has, as a function executed by a single MFP, a copy function of printing, by a printer, an image scanned by a scanner, a function of directly reading image data stored in a memory card or the like and printing it, or a function of receiving image data from a digital camera and printing it.

In FIG. 3, the MFP 301 includes a reading unit 302 such as a flat-bed scanner, a printing unit 303 of an inkjet type, electrophotography, or the like, a display unit 304 serving as a display panel, and an operation unit 305 serving as an operation panel having various keys, switches, and the like. A USB port (not shown) is provided on the rear surface of the MFP 301 as a PC interface for communicating with a PC, and enables communication with a PC. In addition to these components, the MFP 301 includes a card interface 306 serving as a card slot for reading out data from a variety of memory cards, and a camera interface 307 serving as a camera port for communicating data with a digital camera. Further, the MFP 301 includes an auto document feeder (to be referred to as an ADF hereinafter) 308 for automatically setting an original onto the original table.

Figure 4:
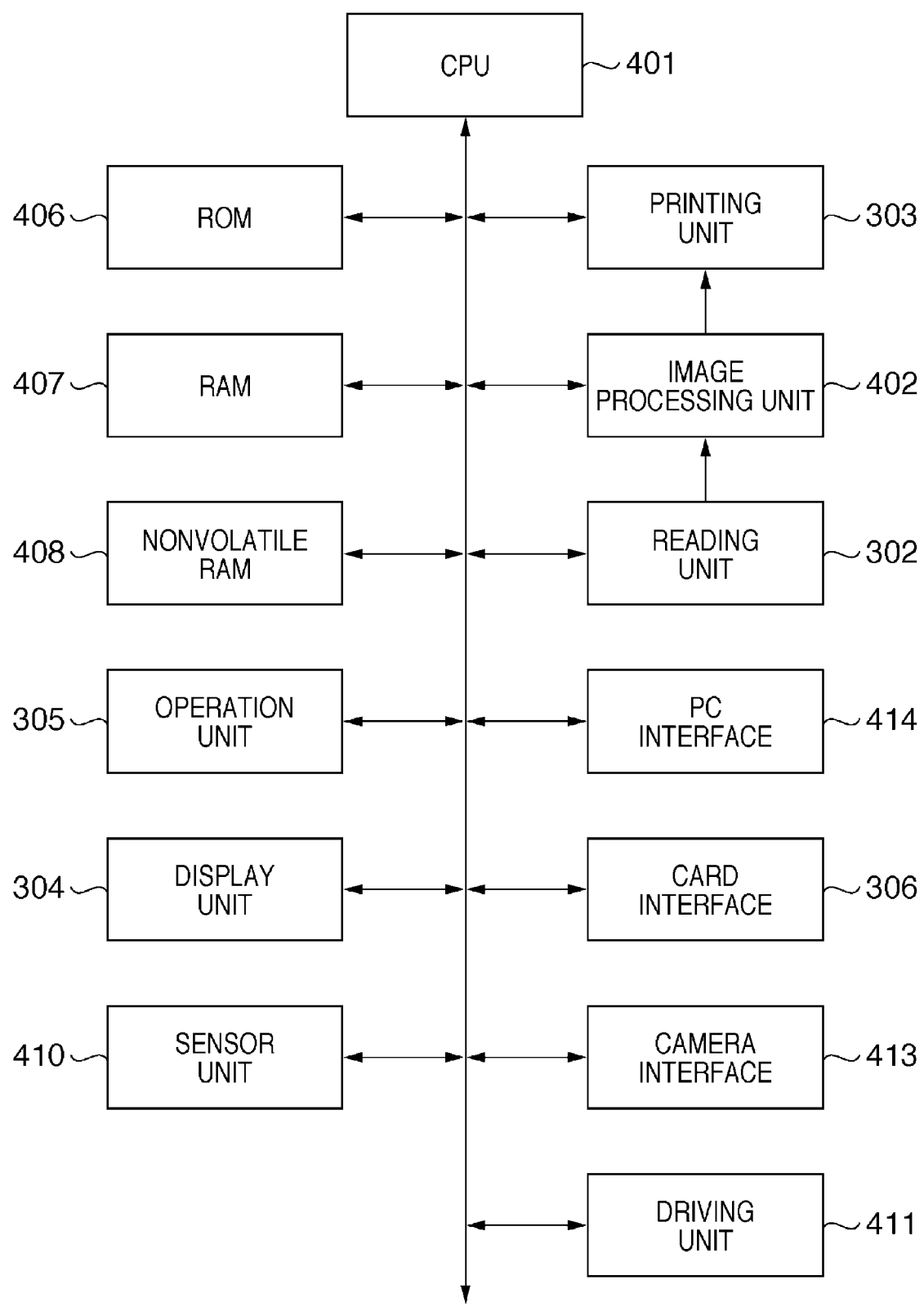
FIG. 4 is a block diagram of the MFP shown in FIG. 3.

FIG. 4 is a block diagram of the image processing system 101 shown in FIG. 3.

In FIG. 4, a CPU 401 controls various functions of the MFP, and executes an image processing program stored in a ROM 406 in accordance with a predetermined operation to the operation unit 305.

The reading unit 302 having a CCD reads an original image to output analog luminance data of red (R), green (G), and blue (B). The reading unit 302 may also include a contact image sensor (CIS) instead of the CCD. When the ADF 308 as shown in FIG. 3 is provided, the reading unit 302 can successively read the original images of order sheets set on the ADF 308.

The card interface 306 receives, in accordance with a predetermined operation to the operation unit 305, image data captured by a digital camera or the like and recorded on a memory card or the like. If necessary, an image processing unit 402 converts image data received via the card interface 306. For example, the image processing unit 402 converts image data corresponding to the color space (e.g., YCbCr) of a digital camera into one corresponding to the RGB color space (e.g., NTSC-RGB or sRGB). If necessary, the received image data undergoes various processes necessary for an application, such as resolution conversion into an effective pixel count on the basis of header information of the image data.

A camera interface 413 is directly connected to a digital camera to read image data.

The image processing unit 402 performs image processes (to be described later) such as image analysis, calculation of the conversion characteristic, conversion from a luminance signal (RGB) into a density signal (CMYK), scaling, gamma conversion, and error diffusion. Data obtained by these image processes are stored in a RAM 407. When corrected data stored in the RAM 407 reach a predetermined amount necessary to print by the printing unit 303, the printing unit 303 executes a print operation.

A nonvolatile RAM 408 is, for example, a battery backup SRAM, and stores data unique to the MFP and the like.

The operation unit 305 has a photo direct print start key to select image data stored in a storage medium and start printing, a key to print an order sheet, and a key to read an order sheet. The operation unit 305 also has a copy start key to perform monochrome copying or color copying, a mode key to designate a mode such as resolution or image quality in copying, a stop key to stop a copy operation or the like, a numeric keypad to input the number of copies, a registration key, and the like. The CPU 401 detects the pressed states of these keys, and controls each unit in accordance with the states.

The display unit 304 includes a dot matrix type liquid crystal display (LCD) and LCD driver, and presents various displays under the control of the CPU 401. The display unit 304 displays the thumbnail of image data stored in a storage medium.

The printing unit 303 includes an inkjet head, general-purpose IC, and the like. The printing unit 303 reads out print data stored in the RAM 407, and prints it out as a hard copy under the control of the CPU 401.

A driving unit 411 includes a stepping motor for driving feed and delivery rollers in the operations of the reading unit 302 and printing unit 303, a gear for transmitting the driving force of the stepping motor, and a driver circuit for controlling the stepping motor.

A sensor unit 410 includes a sensor for detecting the width of a print medium, a sensor for detecting the presence/absence of a print medium, a sensor for detecting the width of an original image, a sensor for detecting the presence/absence of an original image, and a sensor for detecting the type of print medium. Based on pieces of information obtained from these sensors, the CPU 401 detects the states of an original and print medium.

A PC interface 414 is an interface between the PC and the MFP. The MFP executes operations such as printing and scanning on the basis of instructions transmitted from the PC via the PC interface 414.

In copying, image data of an original image read by the reading unit 302 is processed in the MFP, and printed by the printing unit 303. When the user designates a copy operation via the operation unit 305, the reading unit 302 reads an original set on the original table. Image data of the read original image is transmitted to the image processing unit 402, and undergoes image processing (to be described later). The processed image data is transmitted to the printing unit 303, and printed.

Figure 5:
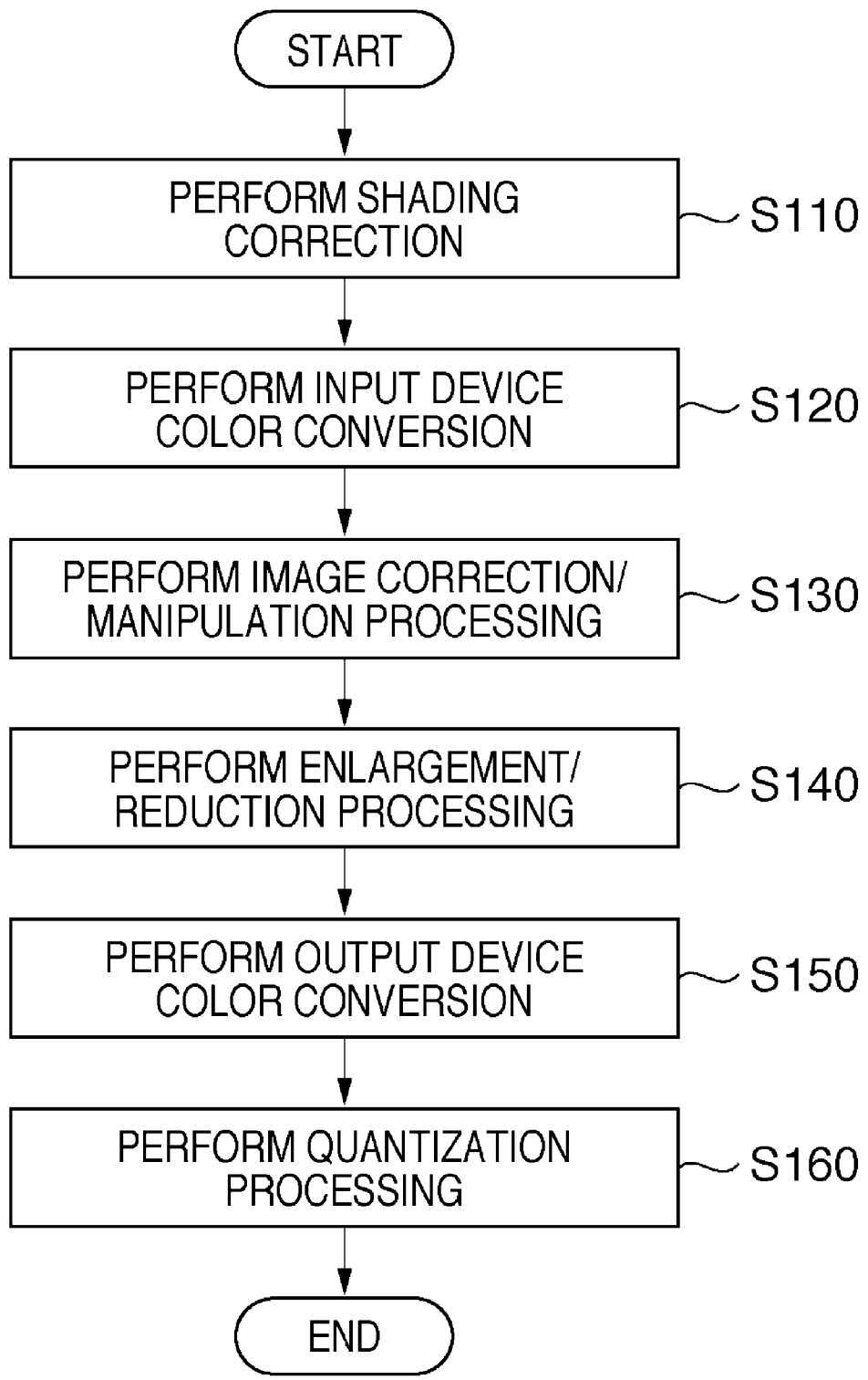
FIG. 5 is a flowchart of image processing executed in copying.

FIG. 5 is a flowchart of image processing executed in copying. Respective steps will be explained, but a detailed description of steps which are not essential to the present invention will be omitted.

In step S110, image data which is read by the reading unit 302 and A/D-converted undergoes shading correction to correct variations of image sensors.

In step S120, the image data undergoes input device color conversion to convert image data corresponding to a color space unique to the reading unit 302 serving as an input device into image data corresponding to a standard color space. More specifically, the image data is converted into image data corresponding to a color space such as sRGB defined by IEC (International Electrotechnical Commission) or AdobeRGB proposed by Adobe Systems. The conversion method is, for example, an arithmetic method based on a 3×3 or 3×9 matrix, or a look-up table method of looking up to a table describing a conversion rule and determining a color space on the basis of the table.

In step S130, the image data having undergone color conversion undergoes image correction/manipulation processing. The processing contents include edge emphasis processing of correcting blurring generated upon reading an original image, processing of removing offset generated upon reading by light irradiation, and character manipulation processing for improving character readability.

In step S140, enlargement/reduction processing is executed to convert the image data at a desired ratio when the user designates resizing or in layout copying of laying out two original sheets on one paper sheet. The conversion method is generally a bicubic method, nearest neighbor method, or the like. When laying out and printing a plurality of images on one print medium in layout copying or the like, the operations in steps S110 to S140 are repeated to read a plurality of images and lay out the read images on one page. Then, the process shifts to the following print operation.

In step S150, the image data corresponding to the standard color space is converted into image data corresponding to a color space unique to an output device. Similar to step S120, the conversion method suffices to be the arithmetic method based on a matrix or the look-up table method. Image data corresponding to the color space unique to the output device is converted into one corresponding to the color space of the colors of inks used in an inkjet MFP, such as cyan, magenta, yellow, and black.

In step S160, the image data undergoes quantization processing. For example, when an ink dot is expressed by a binary value representing whether or not to discharge an ink dot, the image data suffices to be binarized according to a quantization method such as error diffusion. As a result, the image data is converted into a data format printable by the printing unit. The print operation is executed based on the image data of this data format, forming an image.

Figure 6:
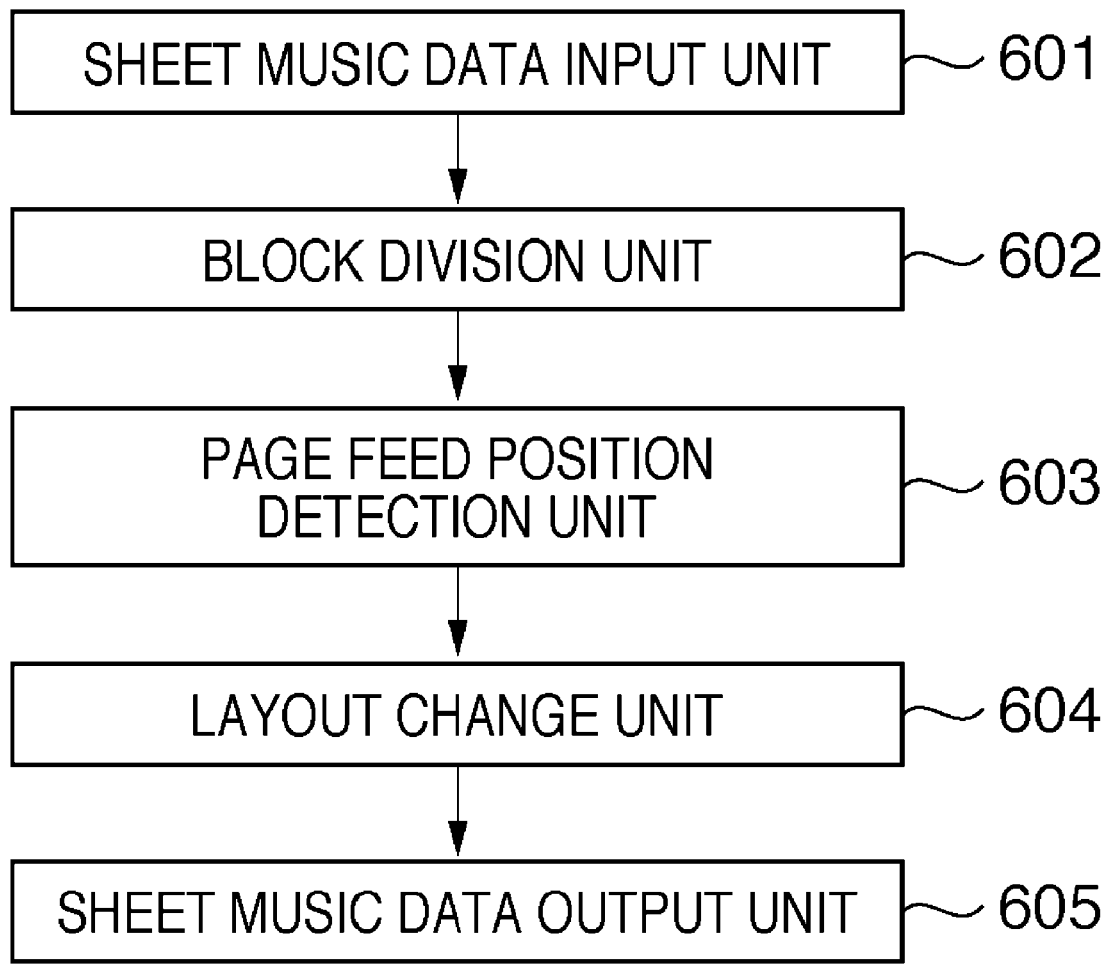
FIG. 6 is a block diagram showing the basic configuration of an image processing system according to the present invention.

A first embodiment of the present invention will be described below referring to the drawings. FIG. 6 is a block diagram showing the basic configuration of an image processing system according to the present invention.

The image processing system in FIG. 6 includes a sheet music data input unit 601 which inputs digital data (sheet music data) of sheet music, and a block division unit 602 which divides sheet music data into blocks. The image processing system also includes a page feed position detection unit 603 which detects a page feed position by analyzing sheet music data input by the sheet music data input unit 601. The image processing system includes a layout change unit 604 which changes the layout of sheet music data on the basis of a page feed position set by the page feed position detection unit. Further, the image processing system includes a sheet music data output unit 605 which outputs new sheet music data whose layout is changed by the layout change unit 604.

The sheet music data input unit 601 may also be a unit which scans sheet music by a scanner, digitizes it, and outputs the digital data, or a unit which receives sheet music data via a network. The sheet music data input unit 601 also has a unit which determines whether input sheet music data is a page in which the page feed position should be set. The sheet music data input unit 601 may also have a unit capable of setting which of the right and left hands of a player for input sheet music is his dominant hand.

The block division unit 602 divides sheet music data input from the sheet music data input unit 601 into blocks, and numbers the respective blocks. There are two types of unit blocks: one is a great staff, and the other is a bar. Both great staff blocks and bar blocks are numbered.

The page feed position detection unit 603 divides, into bars, a page in which the page feed position should be detected, out of sheet music data input from the sheet music data input unit 601, and analyzes sheet music data of each bar. The page feed position detection unit 603 detects a bar having a lowest ratio of pixels printed per unit area from the images of bars expressed by sheet music data. Then, the page feed position detection unit 603 changes the page feed position. A bar having a lowest ratio of pixels printed per unit area is sometimes positioned near the center of the page. However, this bar is not suitable for a page feed position, so the user may also designate the analysis range of sheet music data. For example, when the user designates analysis of only bars included in a great staff positioned at the bottom of a page, the page feed position is reliably detected from the final great staff. When the sheet music data input unit 601 sets the dominant hand of a player, it is also possible to analyze a great staff played by the dominant hand and detect a page feed position. More specifically, the player plays the piano with his both hands, sheet music is generally formed from great staffs. When the dominant hand of the player is the right hand, only staffs played by the right hand are analyzed to detect a page feed position. In this case, the player can more easily turn a page with his right hand which is his dominant hand.

The layout change unit 604 changes the layout of sheet music data in accordance with a page feed position detected by the page feed position detection unit 603. As the layout change method, sheet music after a page feed position is cut out from a page set to change a page feed position, and is appended to the beginning of the next page. To further easily turn a page, it is also possible to add one bar at the beginning of the next page to a margin at the bottom of the preceding page after sheet music after a page feed position is appended to the beginning of the next page. As the addition method, the size or color of an added bar may also be changed to change its form from that of the remaining bars in order to easily discriminate the added bar from the remaining ones.

The sheet music data output unit 605 may also be a unit which prints out sheet music data on a print medium, or a unit which distributes it via a network.

Figure 7:
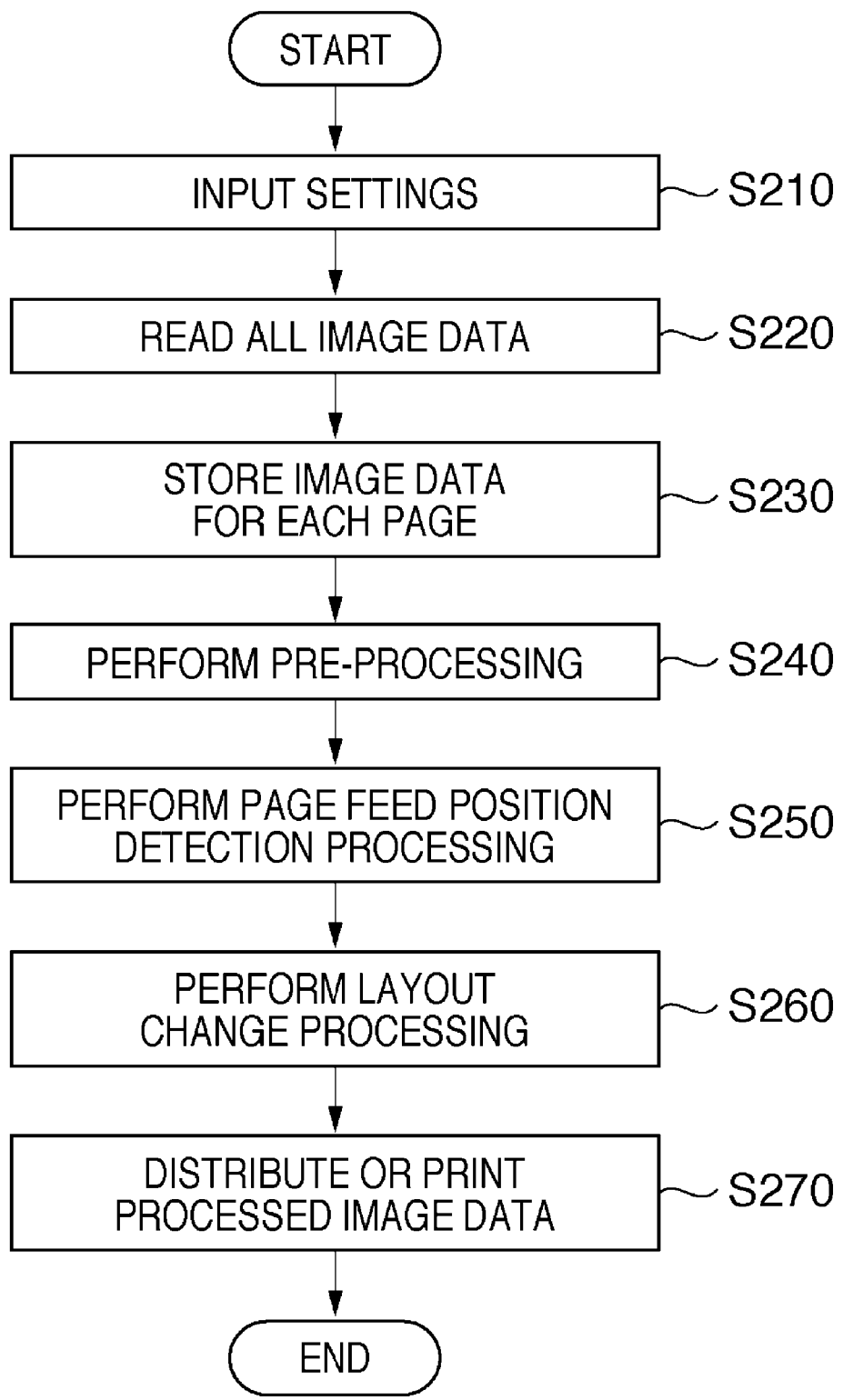
FIG. 7 is a flowchart showing a processing sequence in the image processing system having the configuration shown in FIG. 6.

FIG. 7 shows a sheet music creation processing sequence executed in the image processing system having the configuration shown in FIG. 6. FIG. 7 shows the basic operation of image processing by the image processing system.

In step S210, various settings are input. For example, a setting of whether to continuously scan an original of a plurality of pages, a setting of whether the first page is to be turned when continuously scanning an original, and a page setting of whether a page is to be turned when not continuously scanning an original are input. At this time, it is preferable to store, in a memory, a page set to be turned, so as to discriminate it when performing subsequent processing. Some originals are formed from great staffs each made up of two staffs, like piano sheet music, so the dominant hand may also be set. Further, a great staff in which the page feed position is detected may also be set.

In step S220, all data are read from the sheet music data input unit. By input profile conversion, image data serving as sheet music data is converted from an RGB signal obtained based on the spectral characteristic of a device into a signal corresponding to a standard color space where image processing is done.

In step S230, the image data read in step S220 is stored for each page in the memory.

In step S240, the image data stored in the memory in step S230 undergoes pre-processing and is converted into a format appropriate for analyzing image data. Concrete contents of this processing will be described later.

In step S250, the image data converted in step S240 undergoes page feed position detection processing to detect a page feed position. Concrete contents of this processing will be described later.

In step S260, the layout is changed by layout change processing on the basis of the page feed position detected in step S250. Concrete contents of this processing will be described later.

In step S270, the image data whose layout has been changed in step S260 is distributed via a network, or the printer or the like prints based on this image data.

Figure 8:
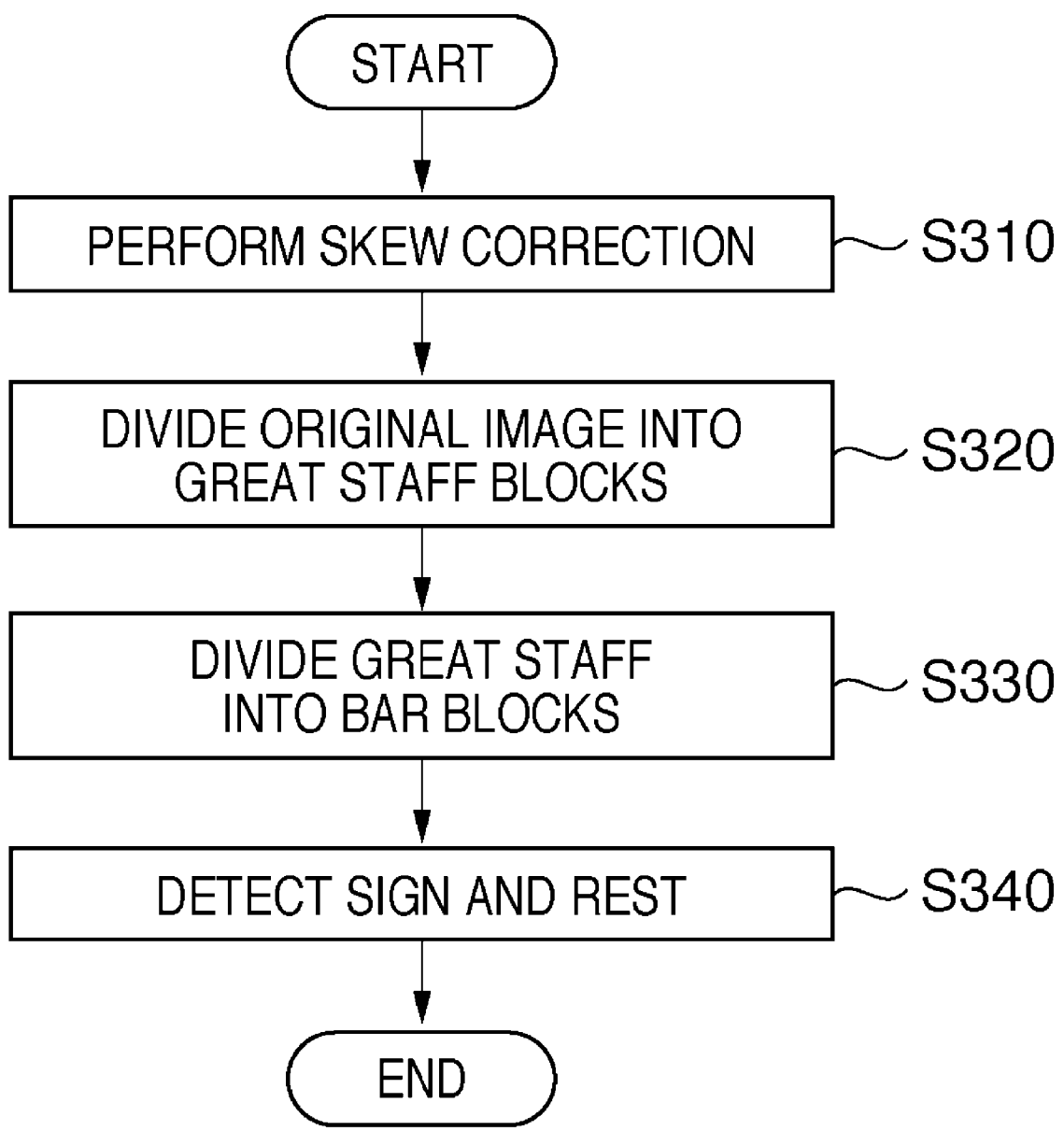
FIG. 8 is a flowchart showing a processing sequence to convert image data into a proper format when analyzing the image data.

Concrete processing in step S240 of FIG. 7 will be explained with reference to the flowchart of FIG. 8.

Figure 9:
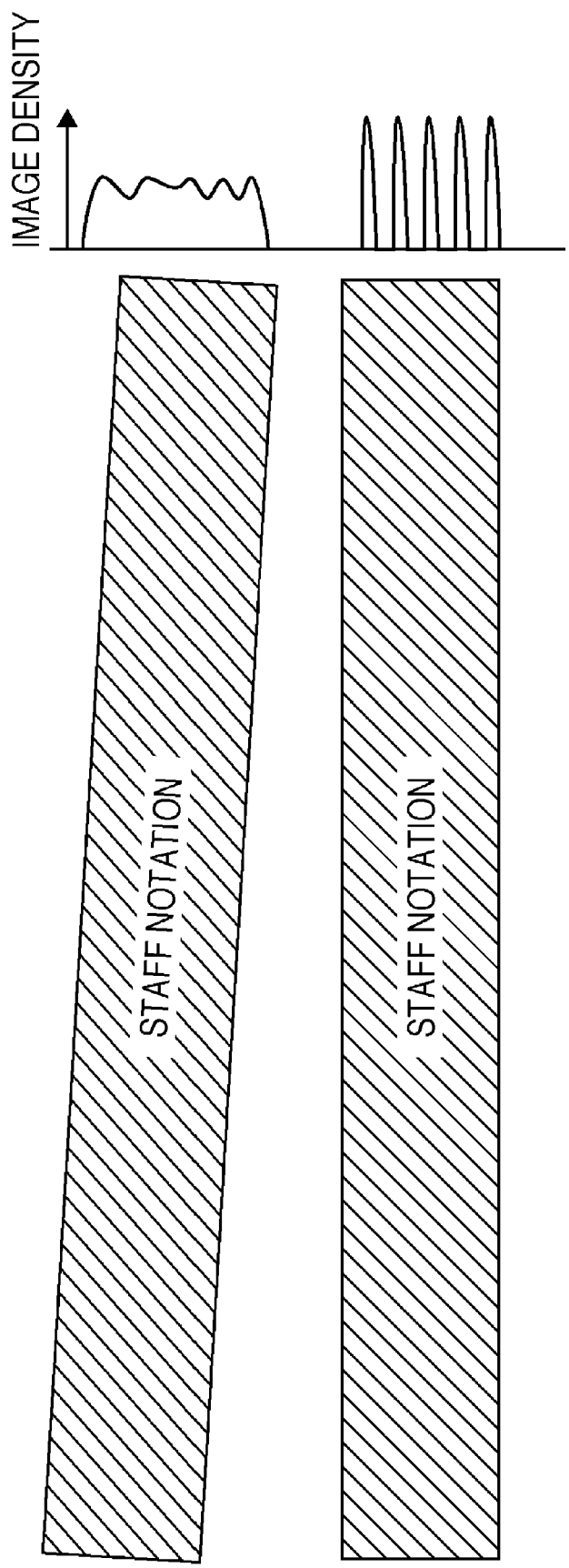
FIG. 9 is a view for explaining skew correction of an original image.

In step S310, skew correction of an original image is executed. This is because the reading device may read an original image with a skew. Skew correction suffices to use a method of correcting a skew using the staff of sheet music. For example, the image density of read sheet music is calculated at a plurality of angles to create a histogram, as shown in FIG. 9. When the angle is parallel to the staff, the histogram draws steep curves at portions corresponding to the five lines of the staff. From this, an angle at which the staff becomes parallel to the reading direction is calculated, and the entire image is rotated and corrected. If necessary, a binarization operation may also be done using a threshold. Although a fixed threshold may also be used, the threshold may also be calculated after creating a brightness histogram when the highest image density of an original image changes between pages or the image density of a margin on an original changes between pages. Filtering processing may also be done to thicken the thin lines of a staff and hook, improving their reproducibility. The reference position of the original image is determined using staff information in the skew-corrected image data. The interval represented by the staff is different between G and F clefs, and thus G and F clefs are detected. Since G and F clefs are described at the beginning of a bar, they undergo pattern matching with G and F clefs stored in advance in the ROM on the basis of the position information.

In step S320, the original image is divided into great staff blocks, and the respective great staffs are numbered as shown in FIG. 10. This is because page feed position detection processing (to be described later) is done for each bar included in a designated great staff. Great staff block division is performed by recognizing G or F clefs described at the beginning.

Figure 11:
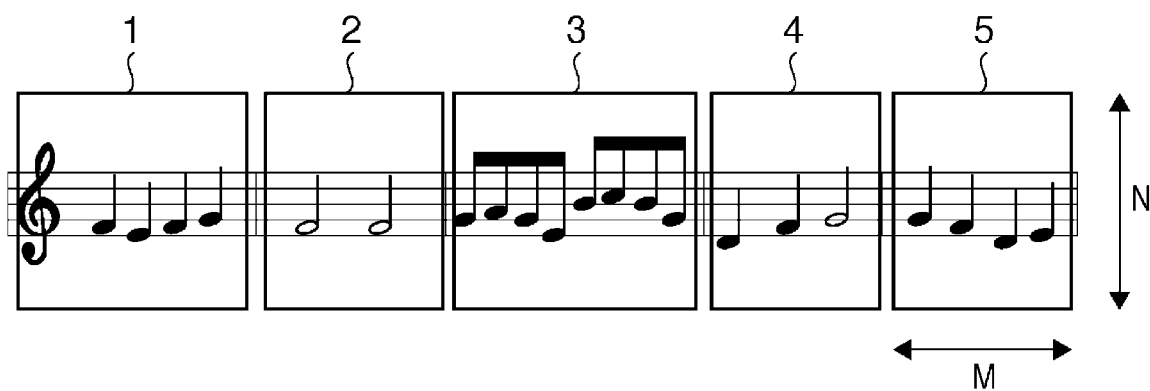
FIG. 11 is a view for explaining bar block division.

In step S330, similar to the great staff block division, each great staff is divided into bar blocks, and the respective bars are numbered. FIG. 11 shows numbered bars (bars 1, 2, 3, 4, and 5) included in a given staff. Bars may also be numbered sequentially from the first bar included in a great staff, as shown in FIG. 11, or from the first bar of a page. Bar block division is performed by recognizing the bar lines of bars. At this time, each bar cut out by block division is recognized as an image. For example, for bar 5 in FIG. 11, an image size of M pixels×N pixels is stored in the RAM in order to analyze the image of each bar in subsequent page feed position detection processing.

Finally in step S340, signs and rests are detected. As the sign and rest detection method, signs and rests are collated with those stored in advance in the ROM by using pattern matching or the like, thereby detecting signs and rests included in each bar. The positions (e.g., great staff numbers and bar numbers) and types of signs and rests are written in the RAM. Processing of recognizing and detecting signs and the like on sheet music can adopt a well-known method, so a description thereof will be omitted.

Figure 12:
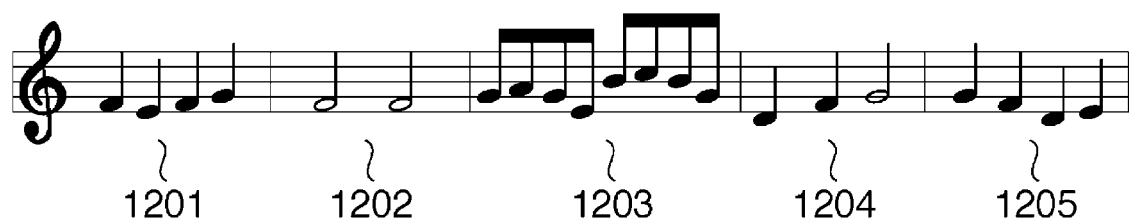
FIG. 12 is a view for explaining a position suitable for a page feed position.

A position suitable for a page feed position will be explained. In short, the suitable position is an easy-to-play portion. The easy-to-play portion is a portion where the number of notes in sheet music is small. This will be explained with reference to FIG. 12. Assume that a designated great staff of a given page includes bars 1201 to 1205 in sheet music data input from the sheet music data input unit 601. Of these five bars, a bar which is easiest to play is the bar 1202 having a smallest number of notes. When each bar is recognized as an image for numerical analysis, the number of notes in the bar 1202 is smallest and the ratio of pixels printed per unit area is lowest among the remaining bars. That is, if each bar can be recognized as an image to obtain the ratio of pixels printed per unit area, a bar having a low ratio of pixels printed per unit area can be specified and detected as a page feed position.

Note that sheet music includes not only notes but also signs and rests such as a sharp and flat. When obtaining the ratio of pixels printed per unit area in a bar including signs and rests, the ratio of pixels printed per unit area is finally attained by excluding the printed pixels of signs and rests. Whether a bar to be analyzed includes a sign or rest can be determined by collating the position and type of sign or rest detected by the above-described sign and rest detection processing in step S340. As a result, the ratio of pixels printed per unit area in a bar can be attained.

Since the length of the staff is different between bars, the pixels of the staff need to be excluded in all bars when obtaining the ratio of pixels printed per unit area in each bar.

Figure 13:
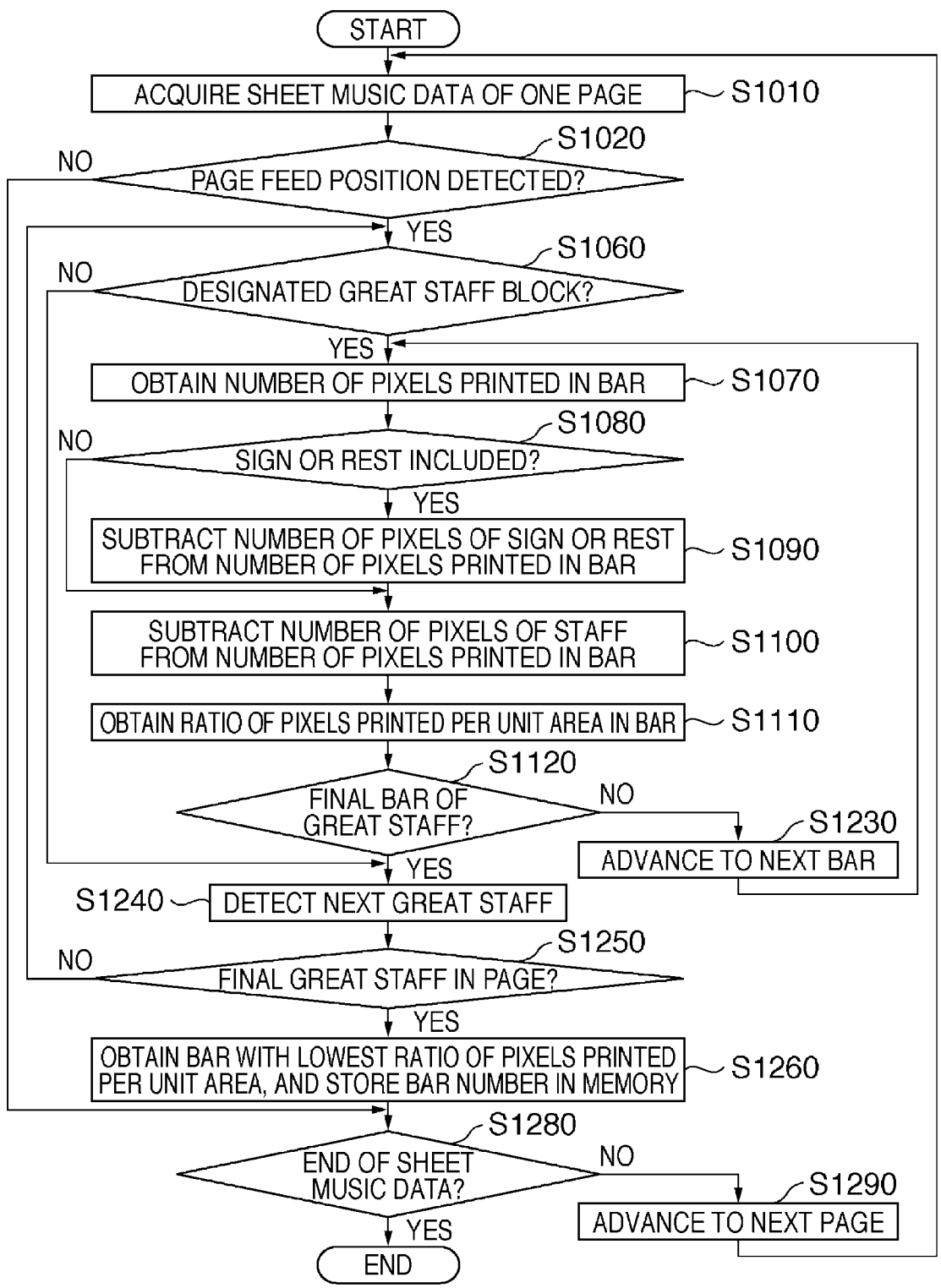
FIG. 13 is a flowchart showing a concrete processing sequence of page feed position detection processing.

Concrete processing of the page feed position detection processing in step S250 of FIG. 7 will be explained with reference to the flowchart of FIG. 13.

In step S1010, sheet music data of one page having undergone the pre-processing in step S240 of FIG. 7 is acquired.

In step S1020, it is determined based on the setting in step S210 of FIG. 7 whether the sheet music data acquired in step S1010 is a page in which the page feed position should be detected. If it is determined that the sheet music data is a page in which the page feed position should be detected, the process advances to step S1060. If it is determined that the sheet music data is not a page in which the page feed position should be detected, the process advances to step S1280.

In step S1060, it is determined whether a great staff to be analyzed is one designated in step S210 of FIG. 7. If it is determined that a great staff to be analyzed is a designated one, the process advances to step S1070. If it is determined that a great staff to be analyzed is not a designated one, the process advances to step S1240.

In step S1070, the number of pixels printed in a bar of interest in the great staff determined in step S1060 to be a designated one is obtained.

In step S1080, it is determined whether the bar of interest includes a sign or rest. If the bar includes a sign or rest, the process advances to step S1090. If the bar includes neither a sign nor rest, the process advances to step S1100.

In step S1090, the number of pixels of the sign or rest is subtracted from the number of pixels printed in the bar of interest that is obtained in step S1070.

In step S1100, the number of pixels of the staff is subtracted from the number of pixels printed in the bar of interest.

In step S1110, the number of pixels printed in the bar of interest that is obtained in step S1100 is divided by the area (e.g., M pixels×N pixels for bar 5 in FIG. 11) of the image range of the bar, obtaining the ratio of pixels printed per unit area.

In step S1120, it is determined whether the bar for which the ratio of pixels printed per unit area has been obtained is the final bar included in the great staff. If the current bar is the final one, the process advances to step S1240; if it is not the final one, to step S1230. In step S1230, steps S1070 to S1120 are repeated for the next bar. In step S1240, the next great staff is detected, and the process advances to step S1250.

In step S1250, it is determined whether the current great staff is the final one in the page. If the current great staff is the final one, the process advances to step S1260; if it is not the final one, returns to step S1060.

In step S1260, a bar having a lowest ratio of pixels printed per unit area is obtained, and its bar number is stored in a memory. A position immediately after a bar of the bar number stored in the memory is set as a page feed position.

In step S1280, it is determined whether the sheet music is the final one. If the sheet music data is not the final one, the process advances to the next page in step S1290; if it is the final one, the page feed position detection processing ends.

Figure 14:
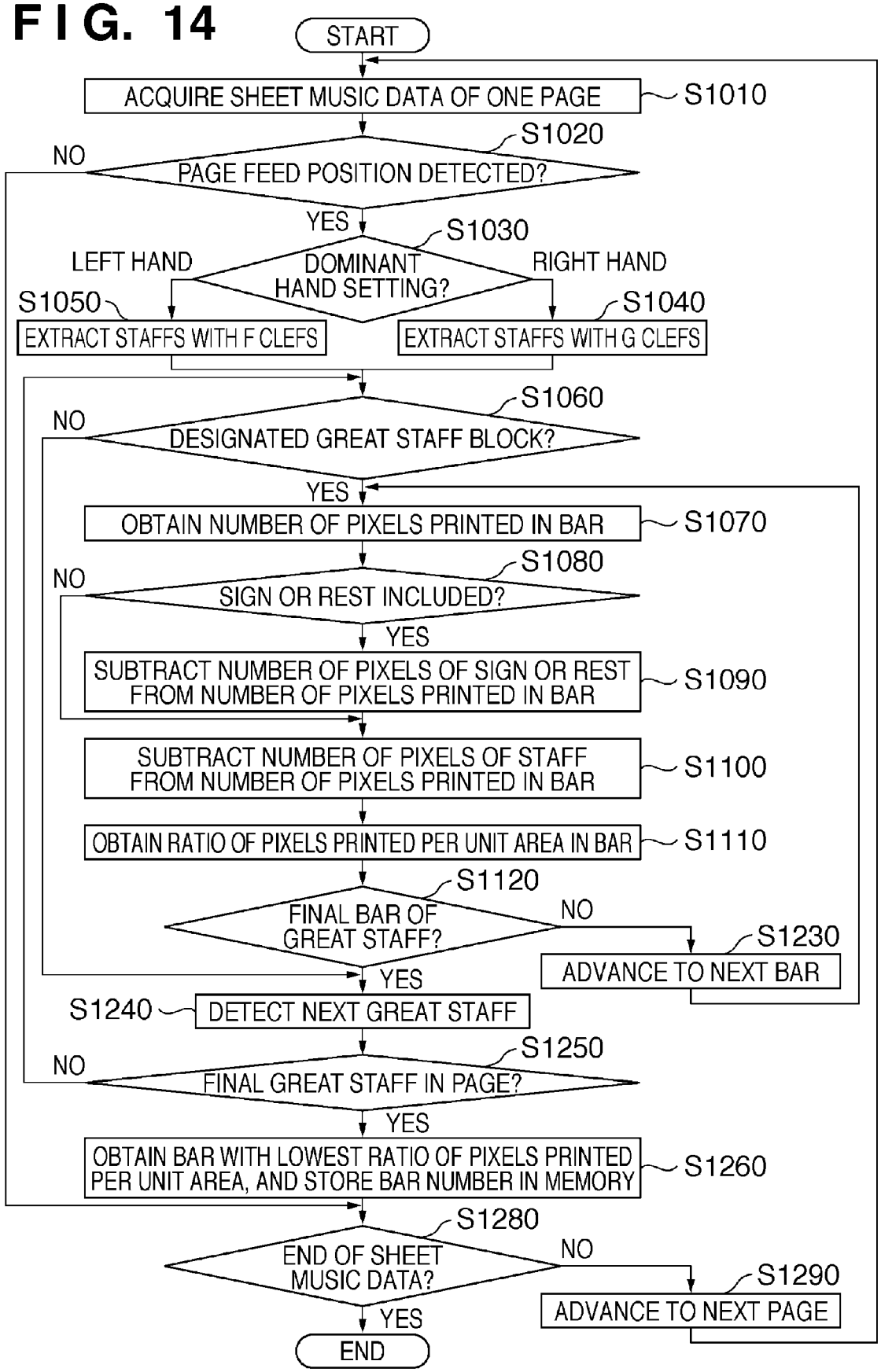
FIG. 14 is a flowchart showing a concrete processing sequence of page feed position detection processing.

Page feed position detection processing when a dominant hand is set in step S210 of FIG. 7 will be explained with reference to FIG. 14. Steps up to step S1020, and step S1060 and subsequent steps are the same as those in FIG. 13, and a description thereof will not be repeated.

If it is determined in step S1020 that sheet music data is a page in which the page feed position should be detected, the process advances to step S1030 to determine the dominant hand setting. If it is determined that the left hand is set as a dominant hand, the process advances to step S1050 to extract staffs with F clefs, and then to step S1060. If it is determined that the right hand is set as a dominant hand, the process advances to step S1040 to extract staffs with G clefs, and then to step S1060.

More specifically, when the right hand is set as a dominant hand, only staffs with G clefs that are played by the right hand are extracted and analyzed. When the left hand is set as a dominant hand, only staffs with F clefs that are played by the left hand are extracted and analyzed. In this case, the player can more smoothly turn a page in accordance with his dominant hand. However, staffs with G clefs are not always played by the right hand, and staffs with F clefs are not always played by the left hand. For this reason, when setting a dominant hand, it is preferable to be able to set even the position of a staff played by the dominant hand.

Figure 15:
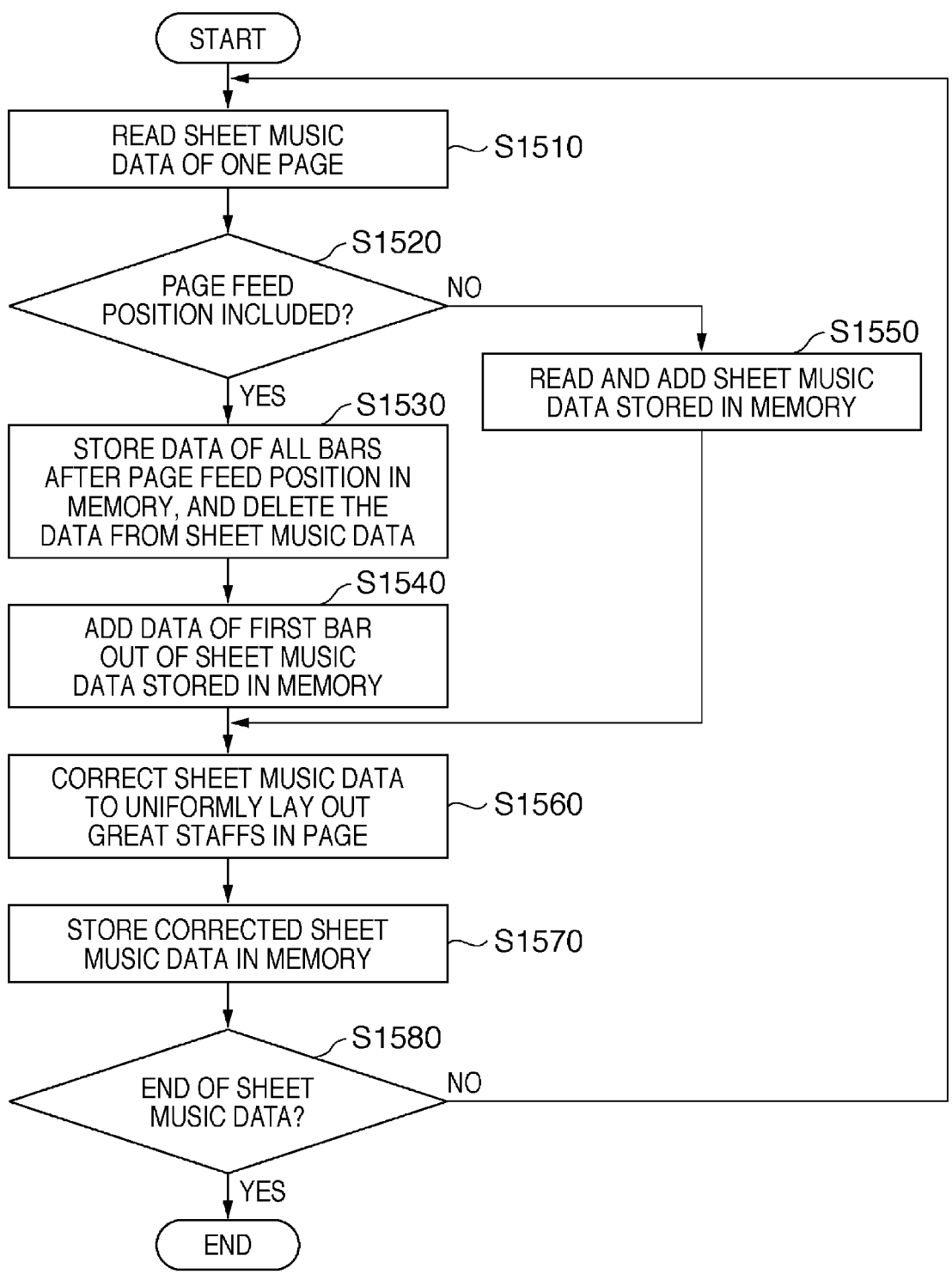
FIG. 15 is a flowchart showing a concrete processing sequence of layout change processing.

Concrete processing of the layout change processing in step S260 of FIG. 7 will be explained with reference to the flowchart of FIG. 15. Assume that a detected page feed position exists in the second half of a page.

In step S1510, sheet music data of one page is read.

In step S1520, it is determined whether the sheet music data read in step S1510 includes a page feed position. If the read sheet music data includes a page feed position, the process advances to step S1530; if it does not include a page feed position, to step S1550. Whether sheet music data includes a page feed position can be determined based on data stored in the memory in the page feed position detection processing in step S250 of FIG. 7.

In step S1530, the page feed position is recognized, and data of all bars after the page feed position are stored in a memory. The data are deleted from the sheet music data read in step S1510.

In step S1540, data of the first bar out of data of respective bars stored in the memory area in step S1530 is read from the memory. The data is added to the end of the page so as to present this bar. The player can check in advance the first bar of the next page that needs to be memorized for turn of a page. As the bar addition method, it is also possible to downsize the added bar to become slightly smaller than the remaining ones, or change the color, as represented by 16A in FIG. 16.

In step S1550, if there is data after the page feed position in sheet music data of the preceding page stored in the memory, the data is read. The data is so added as to add sheet music of a part expressed by the data to the beginning of a page and represent it.

In step S1560, the sheet music data edited in step S1540 or S1550 is corrected to uniformly lay out great staffs in the page.

In step S1570, the sheet music data corrected in step S1560 is stored in the memory.

In step S1580, it is determined whether all sheet music data have been processed. If the above-described processes have not ended for all sheet music data, the process returns to step S1510 to repeat the processes in step S1510 to S1570 for sheet music data of the next page. If the above-described processes have ended for all sheet music data, the layout change processing ends.

When a detected page feed position exists in the second half of a page, no problem arises in the process of step S1550. However, when a detected page feed position exists in the first half of a page, sheet music data after the page feed position may not be fit in one page to which the data are added. In this case, sheet music data before the page feed position may also be added to the end of a page immediately preceding to the page in which the page feed position is detected, as represented by 16B of FIG. 16. To further smoothly turn a page, the same sheet music data as that added to the end of a preceding page may also be added in a faint color to the beginning of a page in which the page feed position is detected, as represented by 16C of FIG. 16, in addition to the process represented by 16B of FIG. 16. The player can check the final part of a preceding page even after turning a page, and can smoothly turn a page.

In the first embodiment, the complexity of performance of each bar is determined by obtaining, for each bar, the ratio of pixels printed per unit area, and the page feed position is detected based on the determination result. However, as the method of determining the complexity of performance, a position where bars having the same phrase successively exist may also be detected, instead of the ratio of pixels printed per unit area in each bar. If the page feed position is set at a position where bars having the same phrase continue, the player can easily memorize the phrase and easily turn a page.

A second embodiment will explain a method of detecting a position where bars having the same phrase continue. Whether bars having the same phrase continue can be determined by analyzing two successive bars. Needless to say, a phrase of three or more bars may also continue. In this case, it cannot be determined by only analyzing two successive bars that a phrase of three or more bars continues. However, in terms of the complexity of performance, a position where a phrase of three or more bars continues is not suitable for a page feed position. This is because for a phrase of three or more bars, a bar having the same phrase as that of a bar immediately before turn of a page does not exist in the next page, and it is difficult to memorize the bar. For this reason, it is difficult to turn a page at a position where a phrase of three or more bars continues. This position is not suitable for a page feed position. From this, to detect a page feed position considering the complexity of performance, two successive bars are compared and analyzed by shifting bars one by one.

Figure 17:
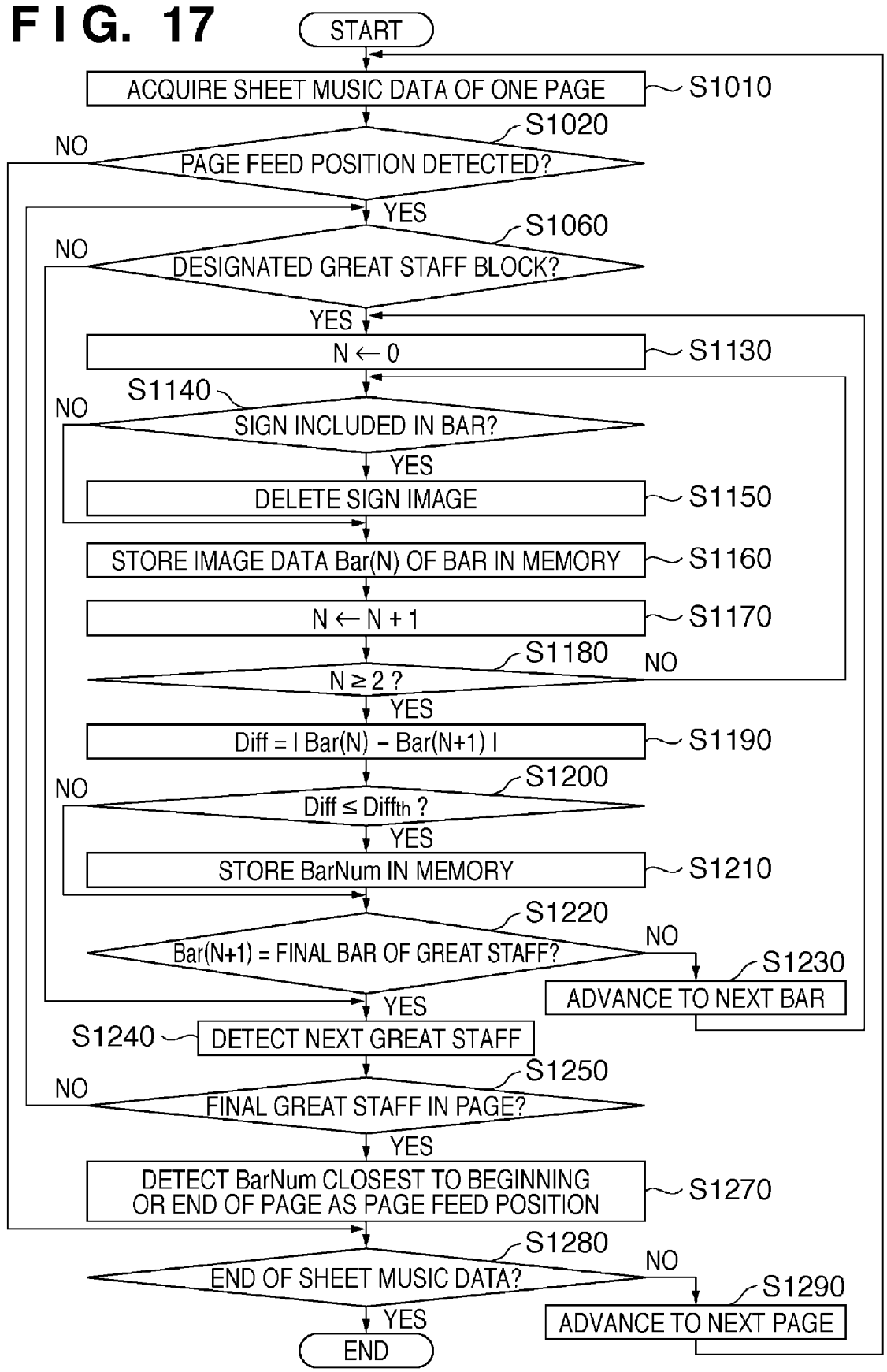
FIG. 17 is a flowchart showing a concrete processing sequence of page feed position detection processing.

FIG. 17 shows the sequence of concrete page feed position detection processing according to the second embodiment. The respective steps of this processing will be explained. Steps up to step S1060, steps S1230 to S1250, and step S1280 and subsequent steps are the same as those in FIG. 13, and a description thereof will not be repeated.

In step S1130, a counter N is initialized.

In step S1140, it is determined whether a bar of interest includes a sign such as a G or F clef. If the bar of interest includes a sign, the process advance to step S1150; if it does not include any sign, to step S1160.

In step S1150, the sign image is deleted from the bar image so as not to determine that two bars, either of which includes a sign, have different phrases upon analyzing the images of the two bars though the two bars have the same phrase.

In step S1160, the image data of the bar of interest is stored as Bar(N) in a memory in order to compare it with image data Bar(N+1) of the next successive bar in subsequent processing.

In step S1170, the counter N is incremented, and the process advances to step S1180.

In step S1180, it is determined whether the value of the counter N is two or more. If the value of the counter N is smaller than 2, the process returns to step S1140 to analyze the images of two successive bars. If the value of the counter N is equal to or larger than 2, the process advances to step S1190.

In step S1190, the absolute value of the difference between Bar(N) and Bar(N+1) stored in the memory in step S1160 is obtained and saved as Diff in the memory.

In step S1200, it is determined whether the value Diff obtained in step S1190 is equal to or smaller than a preset threshold $Diff_{th}$. If the value Diff is equal to or smaller than the threshold $Diff_{th}$, the process advances to step S1210; if it is larger than the threshold $Diff_{th}$, to step S1220. In this case, not whether Diff is 0, but whether Diff is equal to or smaller than the threshold $Diff_{th}$ is determined because even if bars have the same phrase, the bar width is sometimes slightly different between bars. In this case, the positions of notes may also slightly change. If the positions of notes even slightly change, Diff does not become 0. For this reason, Diff is compared with the threshold $Diff_{th}$ to detect bars having the same phrase even when the bar width is slightly different between bars having the same phrase. In this case, the user may designate the threshold $Diff_{th}$. When the user sets the threshold $Diff_{th}$ to a slightly large value, a position where two bars having not completely the same phrase but similar phrases continue can also be detected. Similar phrases can be easily memorized.

In step S1210, Bar(N+1) having Diff equal to or smaller than the threshold $Diff_{th}$ in step S1200 is set as a page feed position candidate, and the bar number BarNum of Bar(N+1) is stored in the memory area.

In step S1220, it is determined whether Bar(N+1) is the final bar of the great staff. If it is determined that Bar(N+1) is the final bar, the process advances to step S1240. If it is determined that Bar(N+1) is not the final bar, the process advances to step S1230 to repeat steps S1130 to S1210 for the next bar.

In step S1270, a bar number corresponding to a position closest to the beginning or end of a page among bar numbers BarNum stored in the memory in step S1210 is detected as a page feed position. This is because, even if the page feed position is detected at a position near the center of a page, this position is not suitable for a page feed position, as described in the first embodiment. Hence, a position as close as possible to the beginning or end of a page is preferentially detected as a page feed position.

The method of detecting, as a page feed position, a position where bars having the same phrase continue has been explained. However, such a position may not exist in a page. Considering this case, when a position where bars having the same phrase continue does not exist in a page, page feed position detection processing can be switched to detect a page feed position in the page according to the method of the first embodiment.

The present invention is also practiced by supplying the program codes of software for implementing the functions of the above-described embodiments to, for example, an apparatus connected to various devices, and operating these devices in accordance with programs stored in the computer of the apparatus or the like.

In this case, the program codes of the software implement the functions of the above-described embodiments, and the program codes themselves and a means such as a storage medium for supplying the program codes to a computer constitute the present invention. Concrete examples of the storage medium are a flexible disk, hard disk, optical disk, magnetooptical disk, CD-ROM, magnetic tape, nonvolatile memory card, and ROM.

The present invention includes program codes when the functions of the above-described embodiments are implemented by executing the program codes supplied to the computer. The present invention also includes program codes when the functions of the above-described embodiments are implemented by an OS (Operating System) and another application software or the like running on the computer in cooperation with each other.

The functions of the above-described embodiments are also implemented when program codes supplied to the computer are stored in the memories of the function expansion board and function expansion unit of the computer, and, for example, the CPUs of the function expansion board and function expansion unit execute processing on the basis of the instructions of the program codes. The present invention also incorporates these program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-331072, filed Dec. 21, 2007, which is hereby incorporated by reference herein in its entirety.

What is claimed is:

1. A sheet music creation method of creating new sheet music by changing a page feed position in sheet music formed from a plurality of pages, the method comprising:
   inputting image data of the sheet music formed from the plurality of pages;
   dividing the image data input in the step of inputting into bars;
   determining, for each page, complexity of performance of each bar divided in the steps of dividing;
   detecting an easy-to-play portion as a page feed position for each page in accordance with a determination result in the step of determining;
   changing a layout of the sheet music on the basis of the page feed position detected in the step of detecting; and
   outputting the sheet music whose layout has been changed in the step of changing.

2. The method according to claim 1, wherein the step of inputting inputs the image data of the sheet music which is formed from the plurality of pages and scanned by a scanner.

3. The method according to claim 2, wherein when the page feed position detected in the step of detecting exists in first half of sheet music of one page, the step of changing adds a portion before the page feed position in the sheet music of one page to an end of an immediately preceding page, and when the page feed position exists in second half, adds a portion after the page feed position in the sheet music of one page to a beginning of a next page.

4. The method according to claim 1, wherein the step of changing lays out a first bar of a next page at an end of sheet music of one page in a form different from a form of remaining bars.

5. The method according to claim 1, further comprising the step of selecting, from sheet music in which no page feed position is changed, a page in which the page feed position is to be changed,
wherein the step of determining determines the complexity of performance of each bar in the page selected in the step of selecting, and
the step of detecting detects a page feed position in the page selected in the step of selecting.

6. The method according to claim 1, wherein the step of outputting includes the step of printing layout-changed sheet music by a printing apparatus.

7. The method according to claim 1, wherein
as for the complexity of performance of each bar, as a ratio of pixels printed per unit area in an image range of each bar is higher, the step of determining determines that the bar is more complex, and
the step of detecting detects, as the page feed position, a position immediately after a bar having a lowest ratio.

8. The method according to claim 1, wherein
as for the complexity of performance of each bar, the step of determining determines that a portion at which bars having the same phrase continue is easy to play, and
the step of detecting detects, as the page feed position, a position between successive bars having the same phrase.

9. An image processing system comprising:
a host apparatus;
an image reading apparatus configured to be connected to the host apparatus; and
a printing apparatus configured to be connected to the host apparatus;
wherein the system is configured to create new sheet music by changing a page feed position in sheet music formed from a plurality of pages;
wherein the image reading apparatus reads image data of the sheet music formed from the plurality of pages;
wherein the host apparatus includes,
a division unit configured to divide the image data read by the image reading apparatus into bars;
a determination unit configured to determine, for each page, complexity of performance of each bar divided by the division unit;
a page feed position detection unit configured to detect an easy-to-play portion as a page feed position for each page in accordance with a determination result of the determination unit; and
a layout change unit configured to change a layout of the sheet music on the basis of the page feed position detected by the page feed position detection unit; and
wherein the printing apparatus prints the sheet music whose layout has been changed by the layout change unit.

10. An image processing system comprising:
a host apparatus; and
a multifunctional peripheral configured to be connected to the host apparatus, the multifunctional peripheral including,
an image reading unit; and
a printing unit;
wherein the system is configured to create new sheet music by changing a page feed position in sheet music formed from a plurality of pages;
wherein the host apparatus includes,
a division unit configured to divide, into bars, image data of sheet music which is read by the image reading unit and formed from a plurality of pages;
a determination unit configured to determine, for each page, complexity of performance of each bar divided by the division unit;
a page feed position detection unit configured to detect an easy-to-play portion as a page feed position for each page in accordance with a determination result of the determination unit; and
a layout change unit configured to change a layout of the sheet music on the basis of the page feed position detected by the page feed position detection unit; and
wherein the multifunctional peripheral is configured to cause the printing unit to print the sheet music whose layout has been changed by the layout change unit.

11. A computer-readable medium containing computer-executable instructions to be utilized in an image processing system for creating new sheet music by changing a page feed position in sheet music formed from a plurality of pages, the medium comprising:
computer-executable instructions for inputting image data of the sheet music formed from the plurality of pages;
computer-executable instructions for dividing the input image data into bars;
computer-executable instructions for determining, for each page, complexity of performance of each divided bar;
computer-executable instructions for detecting an easy-to-play portion as a page feed position for each page in accordance with a determination result from the determining step;
computer-executable instructions for changing a layout of the sheet music on the basis of a detected page feed position; and
computer-executable instructions for outputting the sheet music whose layout has been changed.

* * * * *